US007961799B2

(12) United States Patent
Kwak et al.

(10) Patent No.: US 7,961,799 B2
(45) Date of Patent: Jun. 14, 2011

(54) JOINT ESTIMATION APPARATUS OF CHANNEL AND FREQUENCY OFFSET BASED ON MULTIBAND-ORTHOGONAL FREQUENCY DIVISION MULTIPLEXING AND THEREOF

(75) Inventors: Kyungsup Kwak, Incheon (KR); SunKyung Shin, GoYang-Si (KR); TaeKyung Sung, Incheon (KR); SangKyoon Nam, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 668 days.

(21) Appl. No.: 12/015,224

(22) Filed: Jan. 16, 2008

(65) Prior Publication Data
US 2009/0154625 A1 Jun. 18, 2009

(30) Foreign Application Priority Data
Dec. 18, 2007 (KR) .................. 10-2007-0133696

(51) Int. Cl.
*H04K 1/10* (2006.01)
(52) U.S. Cl. ........ 375/260; 375/267; 375/278; 375/284; 375/285; 375/299; 375/347; 375/348; 375/349
(58) Field of Classification Search .................. 375/260, 375/267, 278, 284, 285, 299, 347, 348, 349
See application file for complete search history.

(56) References Cited

U.S. PATENT DOCUMENTS

| 2007/0110172 | A1* | 5/2007 | Faulkner et al. | ............. | 375/260 |
| 2007/0133699 | A1* | 6/2007 | Roh et al. | ................ | 375/260 |
| 2007/0172000 | A1* | 7/2007 | Hamamoto et al. | .......... | 375/324 |

OTHER PUBLICATIONS

Lee et al. Fast AFC technique using a code estimation and binary search algorithm for wideband frequency synthesis, 2005, IEEE Proceedings of ESSCIRC, Grenoble, France, 2005, pp. 181-184.*

Michele Morelli, et al. Synchronization Techniques for Orthogonal Frequency Division Multiple Access (OFDMA) : A Tutorial Review Proceedings of the IEEE, vol. 95, No. 7, Jul. 2007, p. 1394-1427 IEEE, KR.
Tevfic Yuecek, et al. ICI Cancellation Based Channel Estimation for OFDM Systems IEICE Trans. Commun., vol. E88-B, No. 5, May 2005, p. 2200, 2201 The Institute of Electronics, Information and Communication Engineers, KR.
Chin Wee Yak, et al. Timing synchronization and frequency offset estimation for Ultra-Wideband (UWB) Multi-Band OFDM systems 2005 IEEE 16th International Symposium on Personal, Indoor and Mobile Radio Communications, p. 471-475 SG.

* cited by examiner

*Primary Examiner* — Kabir A Timory
(74) *Attorney, Agent, or Firm* — Lucas & Mercanti, LLP (57) ABSTRACT

The present invention relates, in general, to a joint channel and frequency offset estimation apparatus and method based on a multi-band-orthogonal frequency division multiplexing system, and, more particularly, to a joint channel and frequency offset estimation apparatus and method based on an MB-OFDM system, which uses low-rank LMMSE channel estimation, in which a low-rank is applied to the MB-OFDM system, thus decreasing complexity, and adds a simple structure using the autocorrelation characteristics of an estimated channel, thus joining channel estimation to frequency offset estimation at low complexity.
The apparatus includes a channel estimator for receiving a Fourier-transformed OFDM signal, and calculating results of channel estimation using a Linear Minimum Mean Square Error (LMMSE) channel estimation, which minimizes a Mean Square Error (MSE) between an actual channel value and an estimated channel value. An autocorrelation unit calculates an autocorrelation value using the results, which are calculated through the channel estimator, in which a frequency offset is considered. A frequency offset estimator calculates a frequency offset, having a maximum value calculated by the autocorrelation unit, and estimating an actual frequency offset.

10 Claims, 12 Drawing Sheets

JOINT ESTIMATION APPARATUS OF CHANNEL AND FREQUENCY OFFSET BASED ON MULTIBAND-ORTHOGONAL FREQUENCY DIVISION MULTIPLEXING AND THEREOF

BACKGROUND OF THE INVENTION

1. Field of the Invention

The present invention relates, in general, to a joint channel and frequency offset estimation apparatus and method based on a Multi-Band-Orthogonal Frequency Division Multiplexing (MB-OFDM) system, and, more particularly, to a joint channel and frequency offset estimation apparatus and method based on an MB-OFDM system, which perform autocorrelation on the results of channel estimation in the MB-OFDM system, thus estimating even a frequency offset.

2. Description of the Related Art

Generally, Orthogonal Frequency Division Multiplexing (OFDM) is a digital modulation scheme, which multiplexes a high-speed transmission signal using a plurality of orthogonal narrow-band carriers, and is configured to divide a data stream having a high transfer rate into data streams, each having a low transfer rate, and to simultaneously transmit the data streams using a plurality of sub-carriers.

That is, OFDM is a digital modulation scheme for dividing high-speed data into a plurality of sub-carriers, in which respective carriers are orthogonal to each other, and for transmitting the sub-carriers, and is thus suitable for fast data transmission because of the characteristics thereof robust to Inter-Symbol Interference (ISI) attributable to a multi-path channel.

In this case, a Multi-Band (MB)-OFDM system is characterized in that it can transmit symbols according to a predetermined frequency hopping pattern in two or three sub-bands on the basis of the OFDM, can realize a high transfer rate, and can eliminate inter-symbol interference using a Cyclic Prefix (CP).

Further, a process in which a transmission device and a reception device modulate or demodulate a plurality of carriers causes the same results that are obtained when an Inverse Discrete Fourier Transform (IDFT) and a DFT are performed. Such a process can be realized at high speed using both Inverse Fast Fourier Transform (IFFT) and FFT.

Furthermore, respective piconets are assigned relative temporal sequences required to occupy specific sub-bands, that is, unique different Time Frequency (TF) codes, so as to transmit data, and are configured to transmit OFDM symbols using the specific sub-bands in a given frequency band on the basis of frequency hopping patterns corresponding to the TF codes.

Therefore, unlike a typical OFDM system, an MB-OFDM system adopts a scheme for transmitting OFDM symbols through multi-band frequency hopping, and has a structure of assigning different sub-band hopping patterns in a specific frequency band to respective piconets due to unique TF codes, so that efficient synchronization is required in consideration of the scheme and the structure.

Further, a Physical Layer Convergence Procedure (PLCP) preamble for synchronization, provided by the technical specifications of the MB-OFDM system, is composed of a total of 30 OFDM symbols. In detail, the PLCP preamble can be divided into three parts, that is, 21 symbols for Packet Synchronization (PS) sequence, 3 symbols for Frame Synchronization (FS) sequence, and 6 symbols for Channel Estimation (CE) sequence.

Moreover, the OFDM system realizes high bandwidth efficiency because orthogonality is maintained between sub-carriers, and has characteristics robust to frequency-selective fading channels because each sub-channel can compensate for distortion attributable to channels using a simple single-tap equalizer. Further, the OFDM system can easily solve the problem of series Inter-Symbol Interference (ISI) using a Cyclic Prefix (CP).

However, when orthogonality between sub-carriers is destroyed due to phase noise and frequency offsets, Inter-Carrier Interference (ICI) is caused, thus greatly degrading the performance of the system.

The cause of such performance degradation may include a carrier frequency offset that causes Inter-Channel Interference (ICI) due to data symbol cyclic shift attributable to Doppler frequency and the error of an oscillator in a reception stage, and a sampling frequency offset that causes ICI due to the destruction of orthogonality between sub-carriers attributable to the error between the sampling frequencies of the Digital to Analog Converter (DAC) of a transmission stage and the Analog to Digital Converter (ADC) of the reception stage, and causes the loss of Signal to Noise Ratio (SNR) attributable to the attenuation of signal amplitude and the phase rotation of data symbols.

In particular, since the MB-OFDM system uses an ultra-high sampling frequency of 528 MHz, it is relatively sensitive to the influence of a sampling frequency offset, compared to conventional wireless communication systems, and thus the precise estimation and compensation of the sampling frequency offset are required.

In order to efficiently estimate the OFDM carrier and sampling frequency offsets, a method of jointly estimating carrier and sampling frequency offsets through the comparison of phases in a frequency domain using training symbols has been proposed.

However, such a method is problematic in that it is somewhat inefficient because the use of training symbols having a special structure must be additionally considered, and, in particular, it is not suitable for technical specifications, such as unique time-related parameters and frequency operating schemes of an MB-OFDM Ultra Wide-Band (UWB) system.

SUMMARY OF THE INVENTION

Accordingly, the present invention has been made keeping in mind the above problems occurring in the prior art, and an object of the present invention is to provide a joint channel and frequency offset estimation apparatus and method based on an MB-OFDM system, which can estimate even a frequency offset using the autocorrelation characteristics of the results of channel estimation while decreasing complexity using the number of singular values suitable for the MB-OFDM system.

Another object of the present invention is to provide a joint channel and frequency offset estimation apparatus and method based on an MB-OFDM system, which can reduce the complexity of channel estimation using links corresponding to channel environments, but enables the apparatus and method to be implemented with low complexity.

The present invention provides an apparatus and method for estimating a channel, which can decrease complexity using the number of singular values suitable for the MB-OFDM system and in which channel estimation can join with frequency offset estimation. For this operation, the present invention is constructed to estimate even a frequency offset using Least Square (LS) channel estimation, Linear Minimum Mean Square Error (LMMSE) channel estimation, low-rank LMMSE channel estimation, and autocorrelation.

In order to accomplish the above objects, the present invention provides a joint channel and frequency offset estimation apparatus based on a Multi-Band-Orthogonal Frequency Division Multiplexing (MB-OFDM) system, comprising a channel estimator for receiving a Fourier-transformed OFDM signal, and calculating results of channel estimation using a Linear Minimum Mean Square Error (LMMSE) channel estimation, which minimizes a Mean Square Error (MSE) between an actual channel value and an estimated channel value; an autocorrelation unit for calculating an autocorrelation value using the results, which are calculated through the channel estimator, in which a frequency offset is considered; and a frequency offset estimator for calculating a frequency offset, having a maximum value calculated by the autocorrelation unit, and estimating an actual frequency offset.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
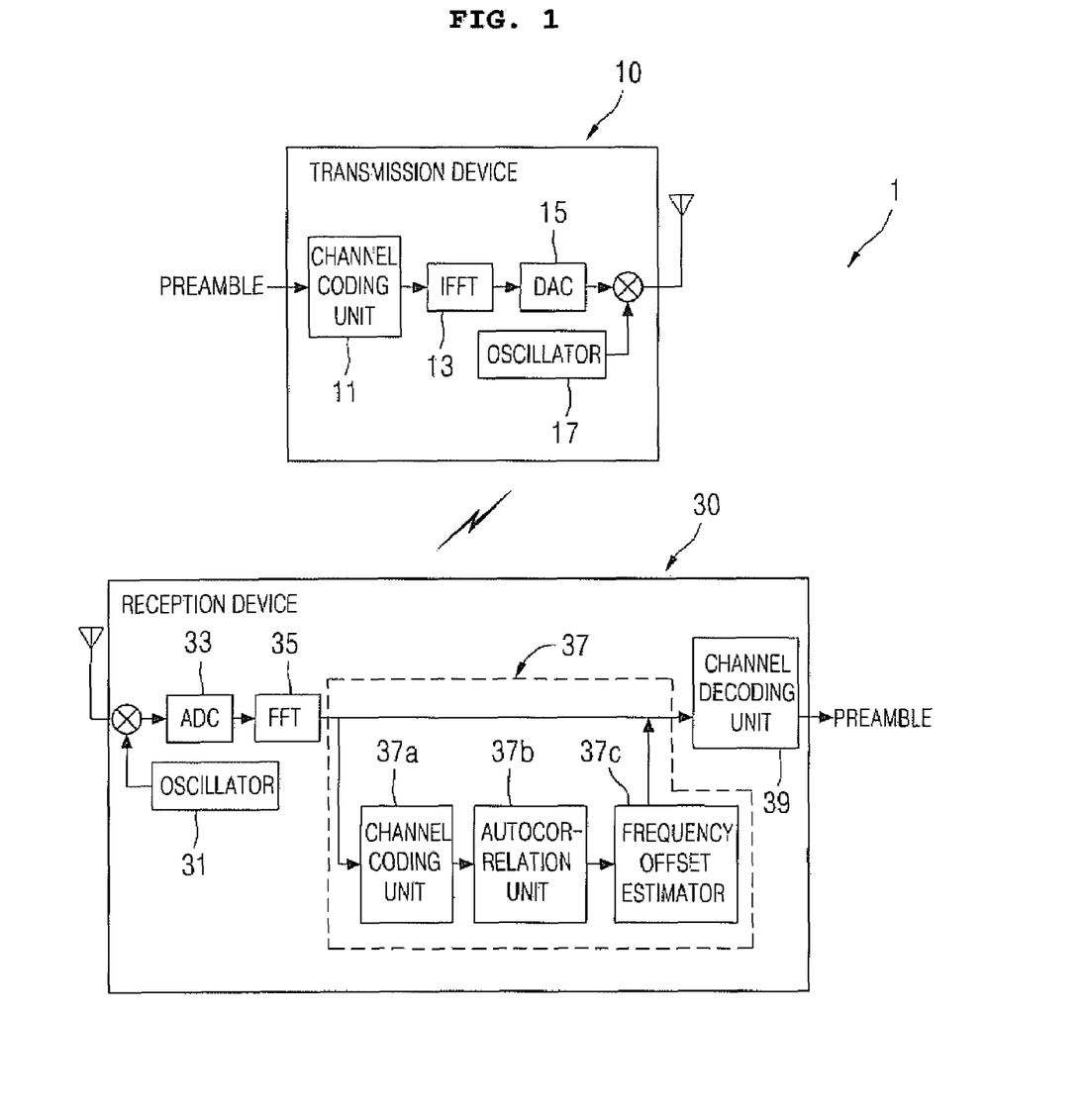
FIG. 1 is a block diagram schematically showing a joint channel and frequency offset estimation apparatus based on an MB-OFDM system according to the present invention.

FIG. 1 is a block diagram schematically showing a joint channel and frequency offset estimation apparatus based on an MB-OFDM system according to the present invention. As shown in the drawing, a Multi-Band-Orthogonal Frequency Division Multiplexing (MB-OFDM) system 1 according to the present invention includes a transmission device 10 and a reception device 30.

The transmission device 10 includes a channel coding unit 11, an Inverse Fast Fourier Transform (IFFT) unit 13, a Digital to Analog Converter (DAC) 15, and an oscillator 17.

The channel coding unit 11 adds redundant bits to a Physical Layer Convergence Procedure (PLCP) preamble so as to recover a signal that will be lost during a transmission procedure. Preferably, in order to prevent burst errors, the sequence of bit streams is scrambled, and convolution coding is performed.

As the number of redundant bits increases, the probability of correcting errors, occurring during the transmission of bit streams through a channel, increases, and the ratio of bits, containing information, to a channel-coded bit stream is called a channel coding rate.

Further, the channel coding rate is '1' when no redundant bit is added to a bit stream, and is '½' when the number of redundant bits and the number of information bits are equal to each other. The channel coding rate can be suitably selected according to the environment of a transmission channel, and can be set to ⅓, ⅔, ¾, etc., in addition to ½.

Moreover, the channel-coded bit stream is input in parallel to the IFFT unit 13. The IFFT unit 13 forms sampled waveforms in a time domain, and generates a sampled OFDM signal by adding the waveforms to each other. The sampled OFDM signal is converted into an analog OFDM signal by the DAC 15.

Further, the OFDM signal is transmitted through the oscillator 17 and a transmission antenna, and is radiated as each band signal using the carrier of each band through a wireless medium.

The reception device 30 includes a reception antenna for receiving the OFDM signal, an oscillator 31 for generating a sine wave corresponding to the center frequency of the OFDM signal, an Analog to Digital Converter (ADC) 33 for converting the received OFDM signal into a digital OFDM signal, a Fast Fourier Transform (FFT) unit 35 for Fourier-transforming the digital OFDM signal, a joint channel and frequency offset estimation apparatus 37 for estimating a channel and a frequency offset, and a channel decoding unit 39.

Further, channel estimation can be derived from a frequency domain using a Least Square (LS) or Minimum Mean Square Error (MMSE) method. Channel estimation using LS has a simple structure, but is sensitive to noise because the statistical characteristics of a channel are not used. Channel estimation using MMSE can reduce the amount of calculation because the secondary moment of a channel, such as autocorrelation and cross correlation, is used, but exhibits excellent performance in the case of a fading channel having a null because a total estimated error is minimized in consideration of noise.

Therefore, the joint channel and frequency offset estimation apparatus 37 according to the present invention uses both LS and MMSE, but is constructed to estimate a frequency offset through the autocorrelation of the results of channel estimation, thus reducing computational complexity and time.

Further, the joint channel and frequency offset estimation apparatus 37 according to the present invention must perform equalization so as to compensate for channel distortion. At this time, since respective sub-channels approximate frequency non-selective fading channels, the equalizer of each sub-channel has a single-tap structure, and the coefficient of the equalizer is the reverse of an estimated sub-channel, so that the reception device 30 requires channel estimation of estimating each sub-channel, and thus includes a channel estimator 37a.

Figure 2:
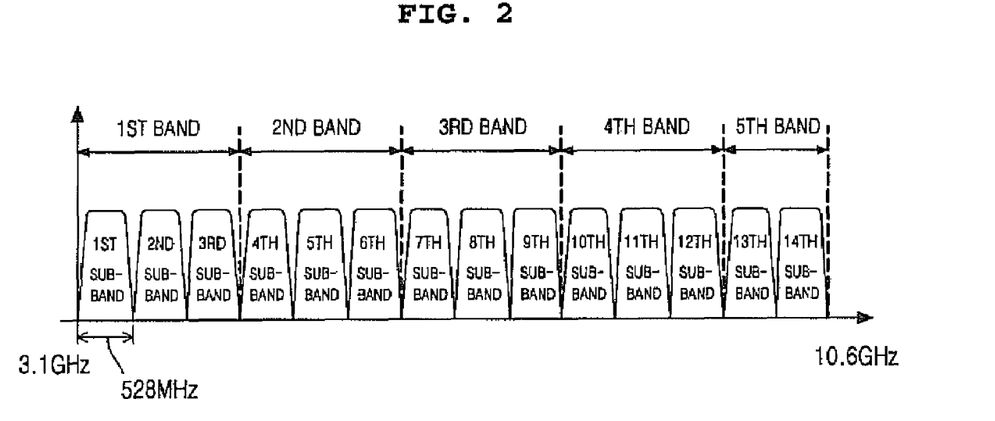
FIG. 2 is a diagram schematically showing frequency division applied to the MB-OFDM system according to the present invention.

FIG. 2 is a diagram schematically showing frequency division applied to the MB-OFDM system according to the present invention. As shown in the drawing, frequency division applied to the MB-OFDM system of the present invention is implemented in such a way that an entire frequency band of 7.5 GHz ranging from 3.1 GHz to 10.6 GHz, which is assigned to indoor wireless communication fields, is divided into a plurality of sub-bands, each having a frequency band of 528 MHz, and thus multiple bands are configured.

In detail, the multiple bands include 14 sub-bands, each having a frequency interval and bandwidth of 528 MHz, and the 14 sub-bands are grouped into 5 frequency bands. When, of the 5 frequency bands, interference occurs in a 5 GHz Unlicensed National Information Infrastructure (UNII) band, a second band may be omitted.

Further, in order to rapidly implement the MB-OFDM system, the use of the first band is presented as a mandatory article, and the use of the second to fifth bands is presented as an optional article. For robustness to a multi-path channel and interference, a Time Frequency Interleaved (TFI)-OFDM is proposed. Through TFI-OFDM, OFDM symbols occupying a single sub-band are transmitted while being interleaved in time and frequency domains.

That is, for an OFDM symbol transmitted at a specific time, only a single sub-band is used among the three sub-bands of the first band. For this operation, a frequency synthesizer is additionally used in a Radio Frequency (RF) stage.

Further, in the MB-OFDM system, Quadrature Phase Shift Keying (QPSK) is preferably used for data modulation, and 128 is preferably selected as the number of points of the FFT unit 35 for OFDM. On the basis of the QPSK and 128 points, the selection of a channel coding rate and the expansion of time and frequency domains are combined with each other, thus enabling various data transfer rates to be supported.

Further, in the MB-OFDM system, basic time-related parameters are presented. Of a total of 128 sub-carriers in the bandwidth of a sub-band corresponding to 528 MHz, 100 sub-carriers are used as data sub-carriers required to use information, 12 sub-carriers are used as pilot sub-carriers equally arranged over the entire frequency band, and the remaining 16 sub-carriers are used as guard and virtual sub-carriers for various purposes.

Furthermore, in order to suppress the generation of ripples in a band, as well as the influence of Inter-Symbol Interference (ISI) and Inter-Carrier Interference (ICI) attributable to multi-path channels, a Zero-Padded Prefix (ZP) method of inserting '0' for a time period of 60.61 [nsec] before an OFDM symbol interval, and transmitting the zero-padded Prefix, is used, instead of a Cyclic Prefix (CP) method, which has been used in a conventional OFDM system.

When such a ZP is used, ISI is prevented, but ICI still exists. Accordingly, in order to remove the ICI, the reception device 30 copies signals appearing due to the influence of channels after a received symbol interval, and adds the copied signals to the first part of the symbols without change, thus obtaining a similar effect as if CPs were inserted.

Further, in order to provide a stable switching time for a frequency synthesizer during a process of hopping between sub-bands required for interleaving in time and frequency domains, a Guard Interval (GI) in which '0' is additionally inserted for a time period of 9.47 [nsec] after the OFDM symbol interval is provided.

In addition, in the MB-OFDM system according to the present invention, the center frequency of the sub-bands present in each band is hopped depending on Time-Frequency (TF) code, so that variable gains are obtained, and interference between simultaneously operating piconets is minimized. In order to stabilize the frequency stabilizer at the time of the hopping, '0' is inserted for a time period of 9.47 ns after the symbol interval.

The parameters of the physical layer of the MB-OFDM system are defined by the following Table 1.

TABLE 1

| Parameter | Value |
| --- | --- |
| Bandwidth | 528 MHz |
| FFT size | 128 |
| Number of subcarriers | 100 |
| Number of defined pilot carriers | 12 |
| Number of guard carriers | 10 |
| Subcarrier frequency spacing | 4.125 MHz |
| IFFT/FFT period | 242.42 MHz |
| Cyclic prefix duration | 60.61 ns |
| Guard interval duration | 9.47 ns |
| Symbol interval | 312.5 ns |
| Modulation | QPSK |
| FEC | Convolutional Code |

Figure 3:
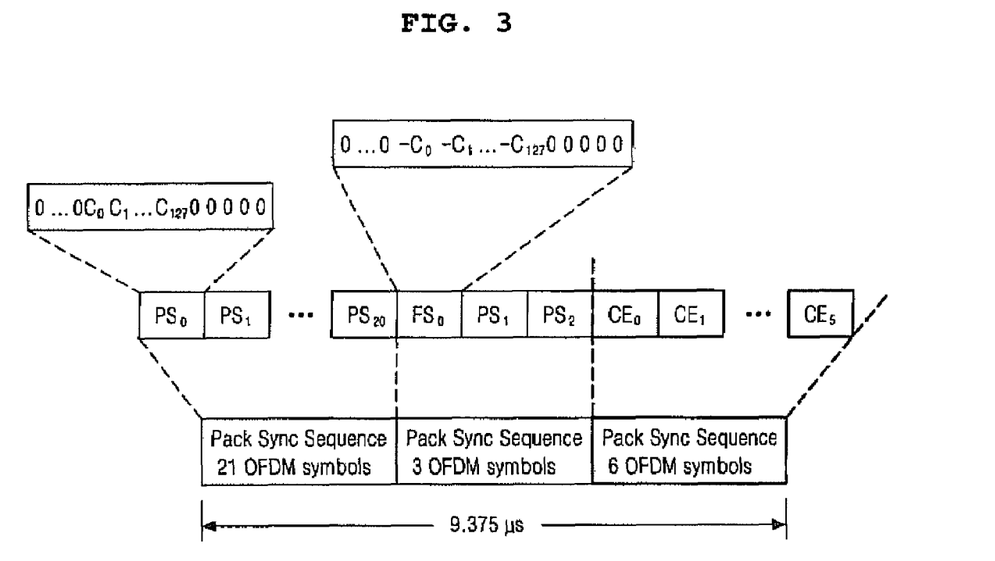
FIG. 3 is a diagram schematically showing a PLCP preamble used in the MB-OFDM system according to the present invention.

FIG. 3 is a diagram schematically showing a PLCP preamble used in the MB-OFDM system according to the present invention. As shown in the drawing, a PLCP preamble required for the synchronization and channel estimation of the MB-OFDM system according to the present invention is composed of a total of 30 OFDM symbols.

The OFDM symbols can be divided into three parts, that is, 21 symbols for Packet Synchronization (PS) sequence, 3 symbols for Frame Synchronization (FS) sequence, and 6 symbols for Channel Estimation (CE) sequence.

The PS sequence, which is a time domain signal, is used for packet detection and synchronization and for the synchronization of coarse frequency and coarse symbol time, and a unique PS sequence is assigned to each piconet to configure a PLCP preamble.

The FS sequence, which is also a time domain signal, has a phase difference of 180° with respect to each PS sequence, and is used to detect the boundary of the PS sequence within the PLCP preamble.

Finally, the CE sequence, which is a frequency domain signal, is equally assigned to all piconets in common, and is used for the synchronization of fine frequency and fine symbol time, in addition to channel estimation.

Further, in the MB-OFDM system, in order to minimize the interference between piconets and provide robustness to multi-path channels, all OFDM symbols, including the preamble, as well as data within a PLCP frame, are transmitted through frequency hopping based on Time Frequency (TF) codes assigned to respective piconets.

Therefore, in order to perform the efficient synchronization of the MB-OFDM system using the PLCP preamble, the pattern of such a TF code is an important factor that must also be taken into consideration.

The MB-OFDM system 1 according to the present invention uses 6 symbols for CE sequence within the PLCP preamble so as to estimate carrier and sampling frequency offsets. The CE sequence is composed of frequency domain signals, and in particular, it uses only 122 of a total of 128 sub-carriers according to the technical specification of the MB-OFDM system 1.

Figure 4:
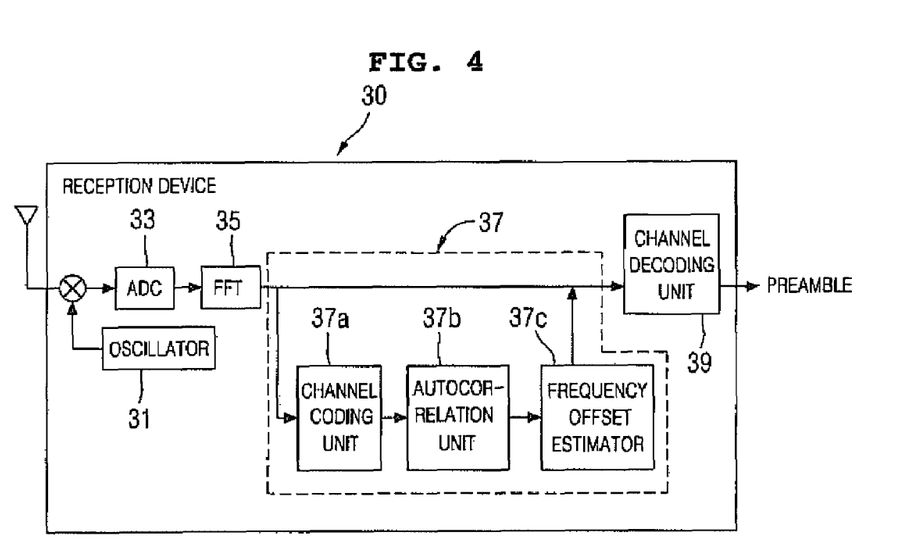
FIG. 4 is a diagram schematically showing the operating process of the channel estimator of the joint channel and frequency offset estimation apparatus of FIG. 1.

FIG. 4 is a diagram schematically showing the operating process of the channel estimator of the joint channel and frequency offset estimation apparatus of FIG. 1. As shown in the drawing, when a reception signal is sensed through a reception antenna, the reception signal is input through the oscillator 31, as shown in the following Equation [1]:

$$Y = S_{\epsilon_p} X H + N \quad [1]$$

In this case, the base-band model of received frequency domain samples can be described in the matrix form of Equation [1], where Y is the vector of received symbols, X is a diagonal matrix of transmitted symbols, H is $[H(1), H(2), \ldots H(N)]^T$, which is the vector estimated using a Channel Frequency Response (CFR), N is an additive white Gaussian noise vector, and $S_{\epsilon_p}$ is an N*N matrix, which is an interference matrix representing leakage between carriers, such as ICI.

If it is assumed that ICI is caused only by a frequency offset, entries of $S_{\epsilon_h}$ can be found using the following Equation [2], $$S_{\epsilon_p}(m,n) = \frac{\sin\pi(m-n+\epsilon_p)}{N\sin\frac{\pi}{N}(m-n+\epsilon_p)} e^{j\pi(m-n+\epsilon_p)} \quad [2]$$

where $\epsilon_p$ is defined by an actual carrier frequency offset, and the interference matrix $S_{\epsilon_p}$ is not known to the reception device 30. The reason for this is that the interference matrix depends on the actual carrier frequency offset $\epsilon_p$. Accordingly, $S_{\epsilon_p}$ can be matched using $S_{\epsilon_h}$, where $\epsilon_h$ is the hypothesis for an actual frequency offset.

Further, the MMSE of the channel frequency response can be obtained by multiplying $(S_{\epsilon_h} X)^{-1}$ to opposite sides of Equation [1], which is given by the following Equation [3], $$(S_{\epsilon_h} X)^{-1} Y = (S_{\epsilon_h} X)^{-1} S_{\epsilon_p} X H + (S_{\epsilon_h} X)^{-1} N \quad [3]$$

$$\hat{H}_{ls} = X^{-1} S_{\epsilon_h}^{-1} S_{\epsilon_p} X H + N_{\epsilon_h}$$

$$= X^{-1} S_{\epsilon_r} X H + N_{\epsilon_h}$$

where $S_{\epsilon_h}$ is an interference matrix generated according to the arbitrary hypothetical frequency offset $\epsilon_h$, $S_{\epsilon_p}$ is an interference matrix generated according to the actual frequency offset $\epsilon_p$, $S_{\epsilon_r}$ is an interference matrix generated using the difference between the hypothetical frequency offset $\epsilon_h$ and the actual frequency offset $\epsilon_p$, Y is the reception signal received through the reception antenna, X is the transmission signal output through the transmission antenna, H is the frequency response of a channel, $N_{\epsilon_h}$ is an additive white Gaussian noise vector including $(S_{\epsilon_h} X)^{-1}$.

The multiplication of two interference matrices in Equation [3] can be calculated as the following Equation [4] using the values of the interference matrices, $$S_{\epsilon_h}^{-1} S_{\epsilon_p} = S_{-\epsilon_h} S_{\epsilon_p} = S_{\epsilon_p - \epsilon_h} = S_{\epsilon_r}, \quad [4]$$

where $\epsilon_r = \epsilon_p - \epsilon_h$, and $\epsilon_r$ is a residual value obtained by subtracting the hypothetical frequency offset $\epsilon_h$ from the actual frequency offset $\epsilon_p$.

Meanwhile, the channel estimator 37a uses the application of Linear Minimum Mean Square Error (LMMSE) estimation. The LMMSE is a channel estimation method of minimizing the Mean Square Error (MSE) between an actual channel value and an estimated channel value, and is characterized in that complexity is higher than that of LS channel estimation, but MSE performance is higher than that of LS channel estimation. The channel estimator 37a uses and applies the LMMSE, $$\hat{H}_{lmmse} = R_{HH}\left(R_{HH} + \sigma_n^2 (XX^H)^{-1}\right)^{-1} \hat{H}_{ls} \quad [5]$$

where $R_{HH}$ is the autocorrelation matrix of a channel, $\sigma_n^2$ is the variance of Additive White Gaussian Noise (AWGN), X is the transmission signal, $\hat{H}_{ls}$ denotes the results of channel estimation, and $(\cdot)^H$ is a conjugate transpose operation.

In this case, since the term $(XX^H)^{-1}$ requires a large amount of calculation, it is replaced with $E\{(XX^H)^{-1}\} = E\{|1/x_k|^2\}I$, thus greatly reducing complexity. Such a calculation can be represented by the following Equation [6]:

$$\hat{H}_{lmmse} = R_{HH}\left(R_{HH} + \frac{\beta}{SNR}I\right)^{-1} \hat{H}_{ls} \quad [6]$$

In this case, $R_{HH}$ is the autocorrelation matrix of a channel, $\beta$ is $E\{|x_k|^2\}E\{|1/x_k|^2\}$, which is determined according to the constellation of a modulation method, Signal to Noise Ratio (SNR) is $E\{|x_k|^2\}/\sigma_n^2$, and $\hat{H}_{ls}$ denotes the results of channel estimation.

Furthermore, when $R_{HH}$ and SNR are previously given according to the statistical characteristics of a channel, Equation [6] is performed only once, and the value thereof is fixed, and thus the fixed value is repeatedly used.

Meanwhile, low-rank LMMSE channel estimation exhibits optimal performance from the standpoint of MSE, but requires a large amount of calculation to obtain the statistical characteristics of channels and noise. In particular, a large portion of the calculation is required to obtain $R_{HH}$ and inverse matrices.

Further, the low-rank LMMSE channel estimation is an estimation method, which reduces the parameter $R_{HH}$ down to an arbitrary threshold point p through singular decomposition, thus greatly decreasing the amount of calculation. The singular decomposition for $R_{HH}$ is given by the following Equation [7], $$R_{HH} = U\Lambda U^H \quad [7]$$

where U is a unitary matrix including a singular vector, $\Lambda$ is a diagonal matrix including a singular value, and $(\cdot)^H$ is a conjugate transpose operation.

Accordingly, low-rank LMMSE channel estimation, in which Equation [7] is considered, is represented by the following Equation [8], $$\hat{H}_{lrlmmse} = UVU^H \left\{ U\left(\Lambda \Big| \frac{\beta}{SNR}I\right)^{-1} U^H \right\} \hat{H}_{ls}, \quad [8]$$

$$= UV\left(\Lambda \Big| \frac{\beta}{SNR}I\right)^{-1} U^H \hat{H}_{ls},$$

$$= U\Delta_p U^H \hat{H}_{ls}$$

where V is a singular matrix, $\hat{H}_{lrlmmse}$ is a channel estimated using the low-rank LMMSE, $\beta$ is $E\{|x_k|^2\}E\{|1/x_k|^2\}$, and $\Delta_p$ is a diagonal matrix and has elements defined by the following Equation [9]:

$$\delta_k = \begin{cases} \dfrac{\lambda_k}{\lambda_k + \dfrac{\beta}{SNR}}, & k = 1, 2, \ldots, p \\ 0, & k = p+1, \ldots, N \end{cases} \quad [9]$$

In this case, $\lambda_k$ is a singular value, p is the threshold of the singular value, N is the magnitude of a Fourier transform, k is the location of each element in a matrix, and $\delta_k$ is the element of a matrix to which the threshold p is applied to the singular matrix.

Meanwhile, the channel estimator 37a according to the present invention uses a technique of estimating a frequency offset using the autocorrelation value of the results of channel estimation when the reception signal is given by Equation [1]. When the low-rank LMMSE channel estimation is applied to LS-based channel estimation, the following Equation [10] is obtained.

$$\hat{H}_{lrlmmse} = U\Delta_p U^H(X^{-1}S_{\epsilon_r}XH + N_{\epsilon_h}) \quad [10]$$

In this case, $\hat{H}_{lrlmmse}$ is a channel matrix estimated using the low-rank LMMSE channel estimation, in which frequency offset estimation is considered, U is a singular matrix, $N_{\epsilon_h}$ is an additive white Gaussian noise vector including the estimation of a frequency offset, $\Delta_p$ is a singular matrix to which the threshold is applied, $(\cdot)^H$ is a conjugate transpose operation, and $S_{\epsilon_h}$ is an interference matrix generated according to an arbitrary hypothetical frequency offset $\epsilon_h$.

Figure 5:
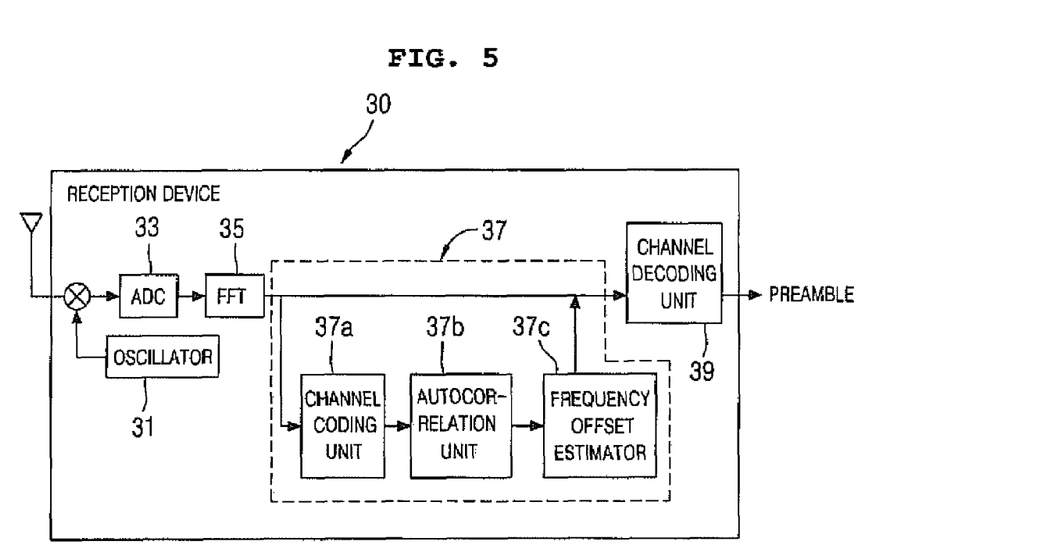
FIG. 5 is a diagram schematically showing the operating process of the autocorrelation unit of the joint channel and frequency offset estimation apparatus of FIG. 1.

FIG. 5 is a diagram schematically showing the operating process of the autocorrelation unit of the joint channel and frequency offset estimation apparatus of FIG. 1. As shown in the drawing, the autocorrelation unit 37b uses the results of autocorrelation of the channel estimated in Equation [10], and can be represented by the following Equation [11]:

$$R_{\hat{H}}(\tau) = \frac{1}{N - 2\tau} \sum_{k=\tau+1}^{N-\tau} \{\hat{H}(k)\hat{H}^*(k - \tau)\} = \quad [11]$$

$$\frac{1}{N-2\tau}\sum_{k=\tau+1}^{N-\tau}\left\{\frac{1}{X_k}\sum_{l=1}^{N}X_l\hat{H}_lS_{\epsilon_r}(k,l)\frac{1}{X_{k-\tau}^*}\sum_{u=1}^{N}X_u^*\hat{H}_u^*S_{\epsilon_h}^*(k-\tau,u) + \right.$$

$$\left.\frac{1}{X_k}\sum_{l=1}^{N}N_lS_{\epsilon_h}(k,l)\frac{1}{X_{k-\tau}^*}\sum_{u=1}^{N}N_u^*S_{\epsilon_h}^*(k-\tau,u)\right\}$$

In this case, the influences of $S_{\epsilon_r}(k,l)$ and $S_{\epsilon_r}^*(k-\tau,u)$ offset each other when t=0, and the results of autocorrelation of the channel are influenced by $|S_{\epsilon_r}(0)|^2$ only when t is not '0'. Therefore, when these characteristics are used, Equation [11] can be represented by the following Equation [12]:

$$R_{\hat{H}}(\tau) = \begin{cases} R_{\hat{H}}(0) + \dfrac{\sigma_n^2}{\sigma_s^2}, & \tau = 0 \\ R_{\hat{H}}(\tau)|S_{\epsilon_r}(0)|^2, & \tau \neq 0 \end{cases} \quad [12]$$

In this case, $R_H$ is the autocorrelation of the estimated channel, $S_{\epsilon_r}$ is an interference matrix generated according to the arbitrary hypothetical frequency offset $\epsilon_h$, and $\sigma_s^2$ is the variance of the reception signal Y, and $\sigma_n^2$ is the variance of AWGN.

Further, as shown in Equation [12], it can be seen that, when $\tau$ is not '0', the results of autocorrelation of the channel are influenced by $|S_{\epsilon_r}(0)|$.

That is, when the hypothetical frequency offset $\epsilon_h$ has the same value as the actual frequency offset $\epsilon_p$, the results of autocorrelation of the estimated channel have the maximum value. However, as the difference between the hypothetical frequency offset $\epsilon_h$ and the actual frequency offset $\epsilon_p$ increases, the value of $|S_{\epsilon_r}(0)|$ decreases, thus decreasing the resulting values of autocorrelation.

The term "autocorrelation" means correlation between a signal value at a specific time and a signal value at another time. When a time delay occurs by a signal value x(t) at time t, an autocorrelation function Rxx($\tau$) is defined by the average of the product of the signal value x(t) at time t and the signal value x(t+$\tau$) at time t+$\tau$.

Through these characteristics, when the results of autocorrelation have the maximum value, the hypothetical frequency offset is calculated, and thus the actual frequency offset occurring due to the oscillator 37b is estimated.

Further, it is assumed that the maximum and minimum ranges of the hypothetical frequency offset $\epsilon_h$ are preset through the characteristics of the system using the results of the autocorrelation unit 37b. The frequency offset is estimated by the frequency offset estimator 37c by finding the frequency offset through binary search in the ranges.

Figure 6:
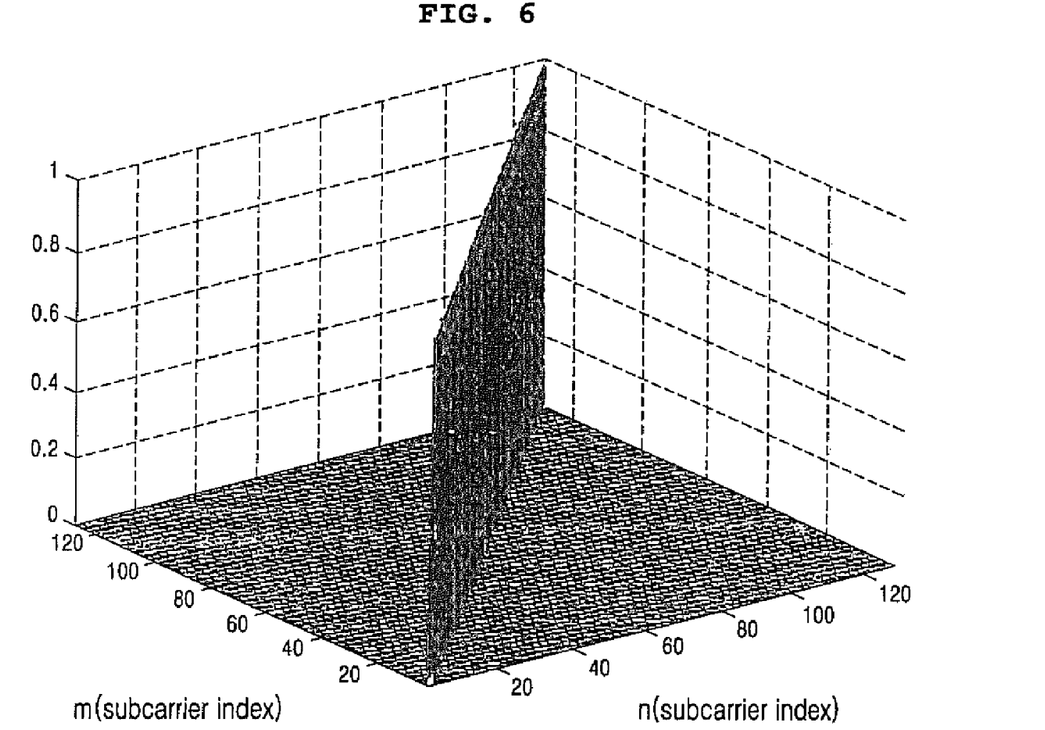
FIG. 6 is a graph showing the concept of deriving the results of autocorrelation for the operation of the joint channel and frequency offset estimation apparatus of FIG. 1.
Figure 7:
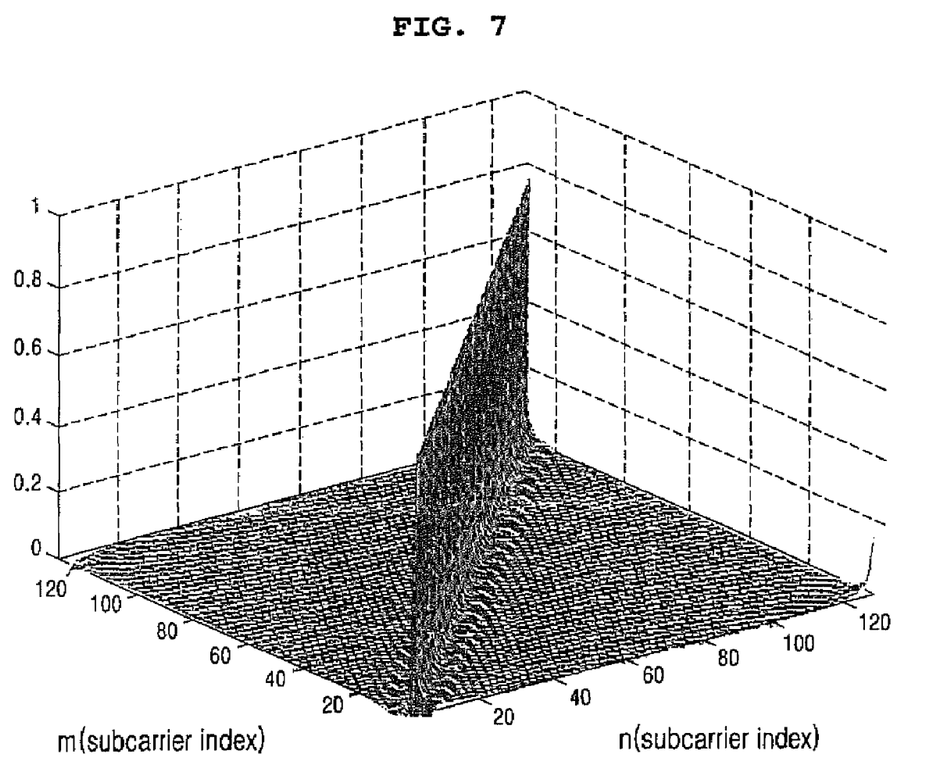
FIG. 7 is a graph showing the concept of deriving the results of autocorrelation for the operation of the joint channel and frequency offset estimation apparatus of FIG. 1.

FIG. 6 is a graph showing the concept of deriving the results of autocorrelation for the operation of the joint channel and frequency offset estimation apparatus of FIG. 1, and FIG. 7 is a graph showing the concept of deriving the results of autocorrelation for the operation of the joint channel and frequency offset estimation apparatus of FIG. 1.

As shown in the drawings, FIG. 6 illustrates the results of operation $S_{\epsilon_h}^{-1}S_{\epsilon_p}$ between the interference matrix $S_{\epsilon_h}$ generated when the hypothetical frequency offset $\epsilon_h$ is 0.1, and the interference matrix $S_{\epsilon_p}$ generated when the actual frequency offset $\epsilon_p$ is 0.1, and FIG. 7 illustrates the results of operation $S_{\epsilon_h}^{-1}S_{\epsilon_p}$ between the interference matrix $S_{\epsilon_h}$ generated when the hypothetical frequency offset $\epsilon_h$ is 0.1, and the interference matrix $S_{\epsilon_p}$ generated when the actual frequency offset $\epsilon_p$ is 0.3.

In the drawings, it can be seen that, when the hypothetical frequency offset $\epsilon_h$ and the actual frequency offset $\epsilon_p$ have the same value, the element of a diagonal matrix has a value of '1', whereas, when the hypothetical frequency offset $\epsilon_h$ and the actual frequency offset $\epsilon_p$ have different values, the element of the diagonal matrix has a value less than '1'.

That is, in the case where the results of autocorrelation exhibit the maximum value, the hypothetical frequency offset $\epsilon_h$ is estimated to be equal to the actual frequency offset $\epsilon_p$, so that the same frequency offset as the actual frequency offset is estimated ($\epsilon_h = \epsilon_p$), and thus optimal results are obtained. In contrast, in the case where the results of autocorrelation exhibit a value less than the maximum value, the hypothetical frequency offset $\epsilon_h$ is estimated to be different from the actual frequency offset $\epsilon_p$, so that the frequency offset different from that actual frequency offset is estimated ($\epsilon_h \neq \epsilon_p$), and thus optimal results are not calculated.

Therefore, it is assumed that the maximum and minimum ranges of the hypothetical frequency offset $\epsilon_h$ are preset through the characteristics of the system using the results of autocorrelation. The frequency offset is estimated by the frequency offset estimator 37c by finding the frequency offset through binary search in the ranges.

Hereinafter, embodiments of the present invention are described.

Figure 8:
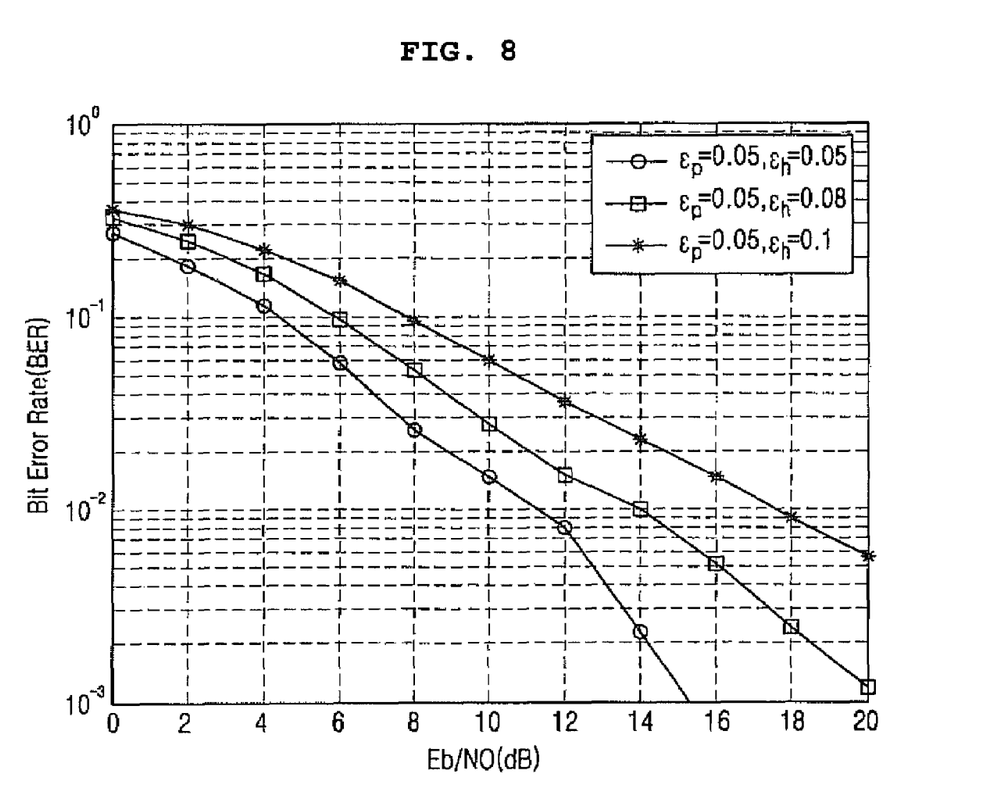
FIG. 8 is a graph obtained according to a joint channel and frequency offset estimation apparatus and method based on an MB-OFDM system according to the present invention.
Figure 9:
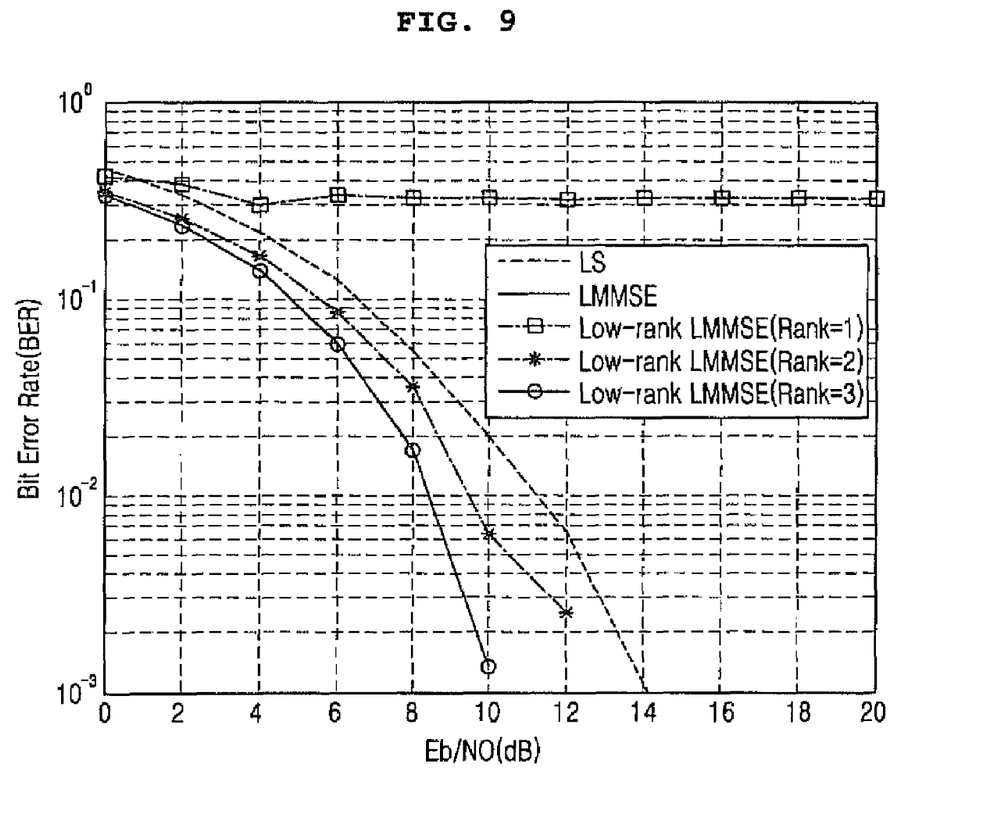
FIG. 9 is a graph showing BERs corresponding to the number of ranks in the joint channel and frequency offset estimation method based on an MB-OFDM system according to the present invention.
Figure 10:
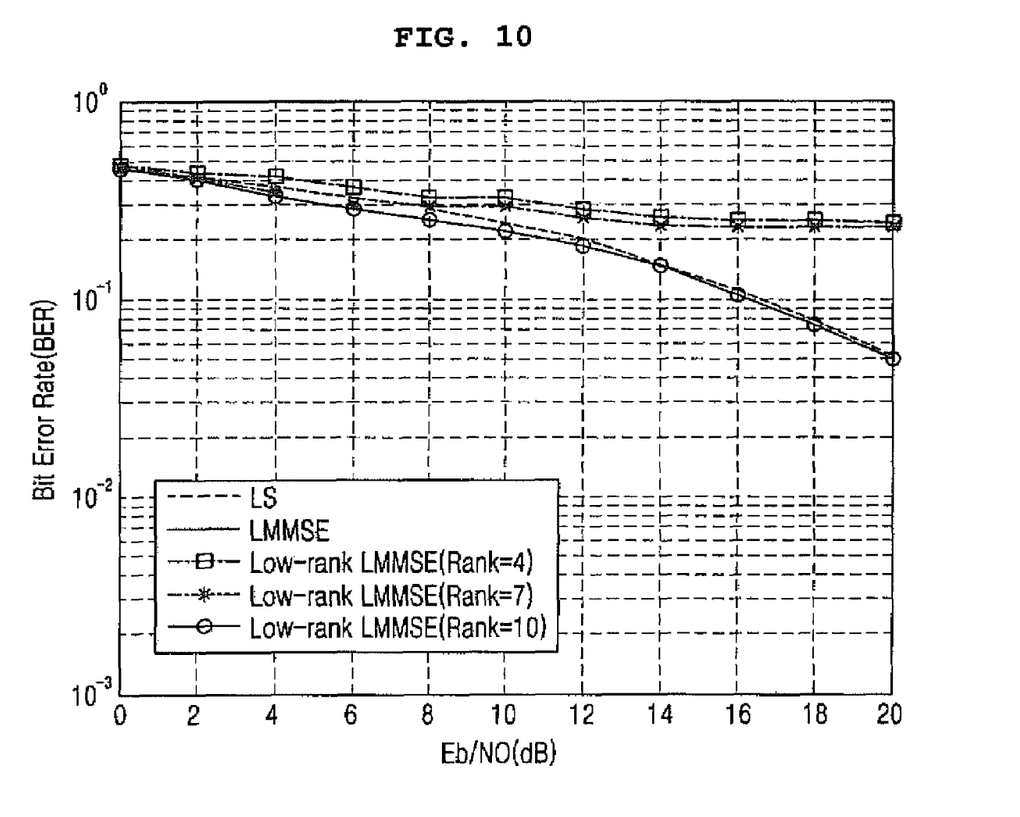
FIG. 10 is a graph showing BERs corresponding to the number of ranks in the joint channel and frequency offset estimation method based on an MB-OFDM system according to the present invention.
Figure 11:
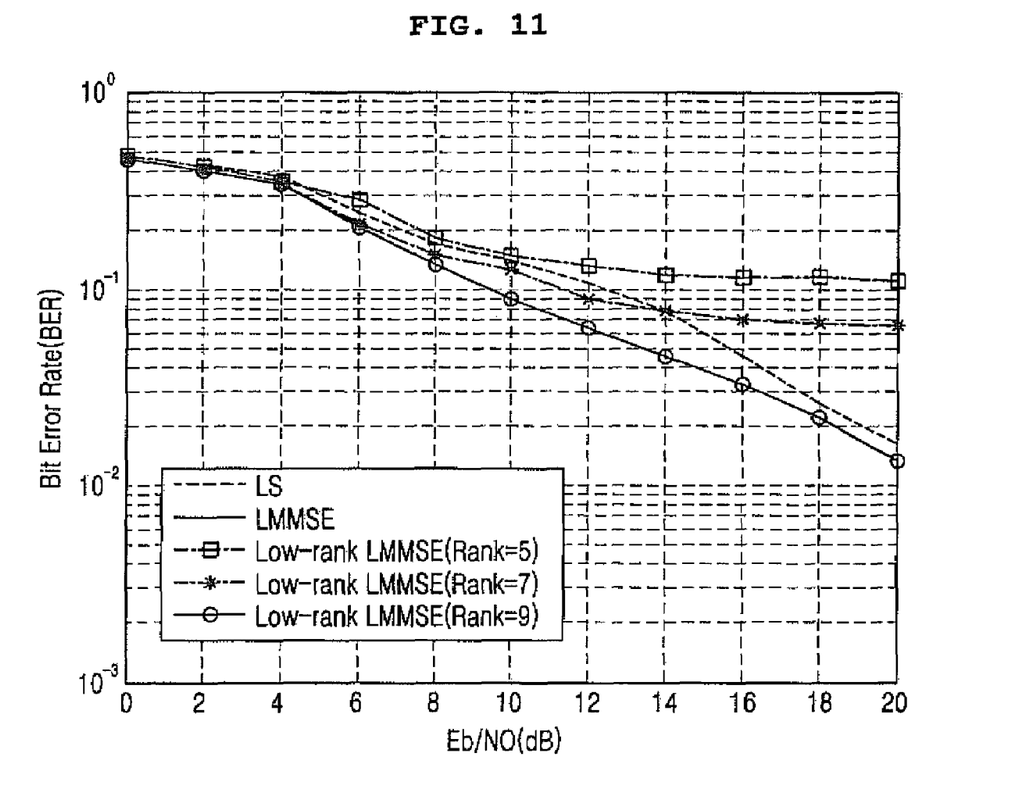
FIG. 11 is a graph showing BERs corresponding to the number of ranks in the joint channel and frequency offset estimation method based on an MB-OFDM system according to the present invention.
Figure 12:
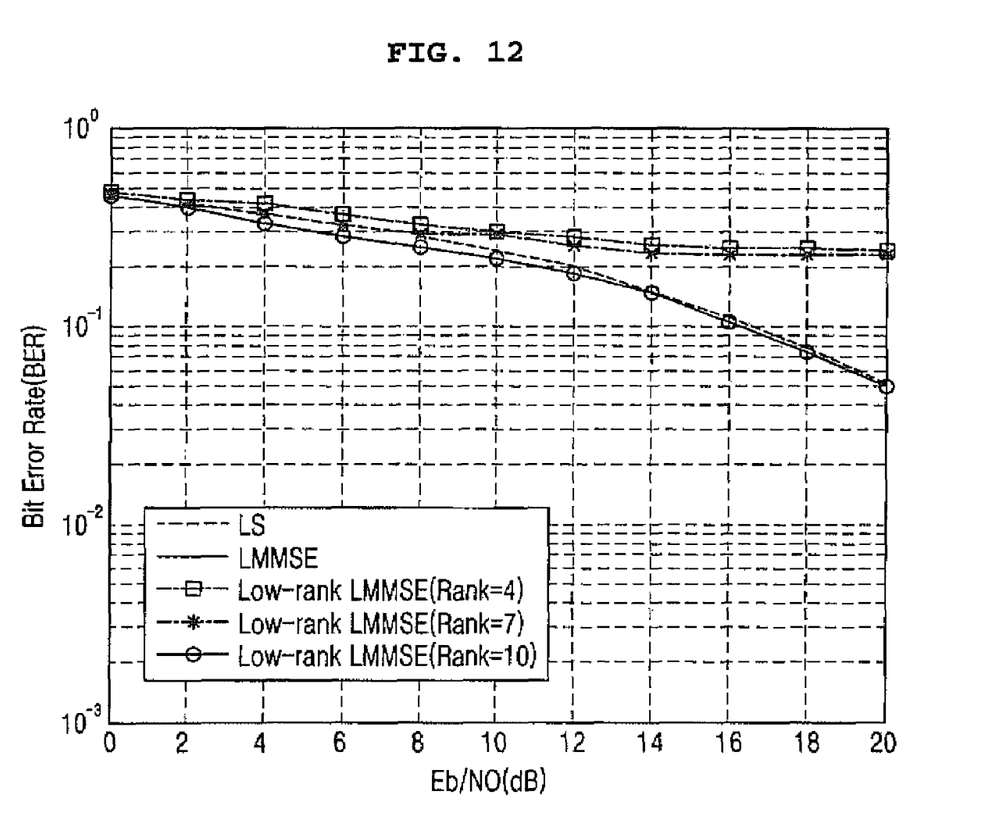
FIG. 12 is a graph showing BERs corresponding to the number of ranks in the joint channel and frequency offset estimation method based on an MB-OFDM system according to the present invention.

FIG. 8 is a graph obtained according to a joint channel and frequency offset estimation apparatus and method based on an MB-OFDM system according to the present invention. As shown in the drawing, performance is evaluated using the apparatus and method of the present invention through simulation.

First, four types of UWB channel models CM1, CM2, CM3, and CM4 proposed in IEEE 802.15. TG3a are used as channel models for performance evaluation.

Further, channel coding is not considered so as to precisely analyze the performance of the apparatus and method according to the present invention, and the first band, designated as a mandatory article, is used as the frequency band of the MB-OFDM system.

Furthermore, the parameters of the MB-OFDM system for simulation are set based on Table 1, the frequency offset $\epsilon_r$, which is the difference between the hypothetical frequency offset $\epsilon_h$ and the actual frequency offset $\epsilon_p$, is assumed to be 0.05, and the range of the frequency offset is assumed to be 0.02 to 0.08.

Referring to the graph obtained by simulating $S_{\epsilon_r}$ corresponding to the difference between the actual frequency offset $\epsilon_p$ and the hypothetical frequency offset $\epsilon_h$ in the CM2 environment using Bit Error Rate (BER) performance, the case where the actual frequency offset $\epsilon_p$ is 0.05, and the hypothetical frequency offset $\epsilon_h$ is 0.05 is the case where the actual value and the hypothesis value are equal to each other.

Further, in the case where the actual frequency offset $\epsilon_p$ is 0.05 and the hypothetical frequency offset $\epsilon_h$ is 0.08, the difference therebetween is 0.03. In the case where the actual frequency offset $\epsilon_p$ is 0.05 and the hypothetical frequency offset $\epsilon_h$ is 0.1, the difference therebetween is 0.05.

As described above, it can be seen that, as the difference between the actual value and the hypothesis value increases, BER performance decreases. Accordingly, when there is no difference between the actual value and the hypothesis value, that is, when the values are equal to each other, the best BER performance is realized.

FIGS. 9 to 12 are graphs showing BERs corresponding to the number of ranks in the joint channel and frequency offset estimation method based on an MB-OFDM system according to the present invention. The drawings illustrate BER performance obtained according to the number of ranks in the method of the present invention in CM1, CM2, CM3, and CM4 environments proposed in IEEE 802.15 TG3a.

Through the drawings, it can be seen that, in the case of the method of the present invention, BER performance is improved by about 1 to 2 dB depending on channel environments, compared to a conventional method based on LS channel estimation. In particular, it can be seen that 3 ranks, 6 ranks, 9 ranks and 10 ranks are respectively used in CM1, CM2, CM3, and CM4, so that an estimation scheme can be implemented with low complexity without causing the loss of BER performance.

As describe above, the present invention having the above construction proposes a technique of estimating a channel using a low-rank LMMSE channel estimation algorithm for decreasing the complexity of the channel estimation and frequency offset estimation of an MB-OFDM system, and of adding a simple structure that uses the autocorrelation characteristics of an estimated channel so as to estimate a frequency offset, thus estimating a channel and a frequency offset by joining channel estimation with frequency offset estimation with low complexity. Further, the present invention is advantageous in that a suitable rank is applied to a channel environment, and the loss of BER is minimized with low complexity, thus estimating a channel and a frequency offset by joining the channel estimation with the frequency offset estimation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A joint channel and frequency offset estimation apparatus based on a Multi-Band-Orthogonal Frequency Division Multiplexing (MB-OFDM) system, comprising:
a channel estimator for receiving a Fourier-transformed OFDM signal, and calculating results of channel estimation using a Linear Minimum Mean Square Error (LMMSE) channel estimation, which minimizes a Mean Square Error (MSE) between an actual channel value and an estimated channel value;
an autocorrelation unit for calculating an autocorrelation value using the results, which are calculated through the channel estimator, in which a frequency offset is considered; and
a frequency offset estimator for calculating a frequency offset, having a maximum value calculated by the autocorrelation unit, and estimating an actual frequency offset,
wherein the frequency offset estimator uses a resulting value of the autocorrelation unit, but maximum and minimum ranges of a hypothetical frequency offset are preset according to the MB-OFDM system, and thus the frequency offset is estimated through a binary search,
wherein the hypothetical frequency offset has the same value as the actual frequency offset, and the resulting value of autocorrelation of the estimated channel have a maximum value, and
wherein as a difference between the hypothetical frequency offset and the actual frequency offset increases, the resulting autocorrelation value decreases.

2. The joint channel and frequency offset estimation apparatus according to claim 1, wherein the channel estimator calculates the results of channel estimation using Least Square (LS) channel estimation.

3. The joint channel and frequency offset estimation apparatus according to claim 1, wherein the channel estimator uses the LMMSE channel estimation, but decreases a rank down to a threshold through singular decomposition using low-rank LMMSE.

4. The joint channel and frequency offset estimation apparatus according to claim 1, wherein the frequency offset estimator uses the frequency offset having the maximum value calculated by the autocorrelation unit, the frequency offset being a hypothetical frequency offset equal to an actual frequency offset, so that the frequency offset estimator uses a hypothetical frequency offset obtained when the resulting value of autocorrelation is calculated as a maximum value.

5. The joint channel and frequency offset estimation apparatus according to claim 1, wherein an interference occurring in a received MB-OFDM signal is an Inter-Carrier Interference (ICI).

6. The joint channel and frequency offset estimation apparatus according to claim 5, wherein the received MB-OFDM signal is a frequency domain signal of a Physical Layer Convergence Procedure (PLCP) preamble, and is a Channel Estimation (CE) sequence used for channel estimation.

7. A joint channel and frequency offset estimation method based on a Multi-Band-Orthogonal Frequency Division Multiplexing (MB-OFDM) system, comprising:

a first step, a reception device sensing an OFDM signal through a reception antenna, Fourier-transforming the OFDM signal, and inputting the Fourier-transformed OFDM signal to a channel estimator;

a second step, the channel estimator calculating results of channel estimation using a Linear Minimum Mean Square Error (LMMSE) channel estimation, which minimizes a Mean Square Error (MSE) between an actual channel value and an estimated channel value, on a basis of the OFDM signal input at the first step;

a third step, an autocorrelation unit calculating results of autocorrelation by joining the results calculated through the channel estimator with Least Square (LS) channel estimation so that an estimated channel value, obtained when the actual channel value is equal to the estimated channel value and thus the autocorrelation value is a maximum value, is calculated; and a fourth step, a frequency offset estimator calculating a frequency offset having the maximum value calculated by the autocorrelation unit, and estimating an actual frequency offset, wherein the frequency offset estimate at the third step uses the results of the autocorrelation unit, but maximum and minimum ranges of a hypothetical frequency offset are preset according to the MB-OFDM system, and thus the frequency offset is estimated through a binary search, wherein the hypothetical frequency offset has the same value as the actual frequency offset, and the results of autocorrelation of the estimated channel have a maximum value, and wherein as a difference between the hypothetical frequency offset and the actual frequency offset increases, the resulting autocorrelation value decreases.

8. The joint channel and frequency offset estimation method according to claim 7, wherein the channel estimator at the second step calculates the results of channel estimation using Least Square (LS) channel estimation.

9. The joint channel and frequency offset estimation method according to claim 7, wherein the channel estimator at the second step uses the LMMSE channel estimation, but decreases a rank down to a threshold through singular decomposition using low-rank LMMSE.

10. The joint channel and frequency offset estimation method according to claim 8, wherein the frequency offset estimator at the third step uses the frequency offset having the maximum value calculated by the autocorrelation unit, the frequency offset being a hypothetical frequency offset equal to an actual frequency offset, so that the frequency offset estimator uses a hypothetical frequency offset obtained when the resulting value of autocorrelation is calculated as a maximum value.

* * * * *